(12) United States Patent
Choi et al.

(10) Patent No.: US 11,050,480 B2
(45) Date of Patent: Jun. 29, 2021

(54) METHOD FOR TRANSMITTING SRS IN WIRELESS COMMUNICATION SYSTEM AND TERMINAL THEREFOR

(71) Applicant: LG ELECTRONICS INC., Seoul (KR)

(72) Inventors: Kukheon Choi, Seoul (KR); Ilmu Byun, Seoul (KR); Kilborn Lee, Seoul (KR); Kyuseok Kim, Seoul (KR); Minki Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 150 days.

(21) Appl. No.: 16/339,871

(22) PCT Filed: Oct. 6, 2016

(86) PCT No.: PCT/KR2016/011179
§ 371 (c)(1),
(2) Date: Apr. 5, 2019

(87) PCT Pub. No.: WO2018/066727
PCT Pub. Date: Apr. 12, 2018

(65) Prior Publication Data
US 2020/0044721 A1   Feb. 6, 2020

(51) Int. Cl.
*H04L 1/02* (2006.01)
*H04L 7/00* (2006.01)
(Continued)

(52) U.S. Cl.
CPC ......... *H04B 7/0695* (2013.01); *H04B 7/0617* (2013.01); *H04L 5/005* (2013.01);
(Continued)

(58) Field of Classification Search
CPC ... H04B 7/0695; H04B 7/0617; H04W 76/11; H04W 72/02; H04W 72/046; H04L 5/005
(Continued)

(56) References Cited

U.S. PATENT DOCUMENTS 8,086,272 B2 * 12/2011 Teo .................. H04B 7/061
  455/562.1
8,599,819 B2 * 12/2013 Kim .................. H04L 5/0082
  370/344
(Continued)

FOREIGN PATENT DOCUMENTS

WO   WO2015090463   6/2015
WO   WO2016095984   6/2016

OTHER PUBLICATIONS

Huawei, HiSilicon,"Support of aperiodic SRS," 3GPP TSG RAN WG1 Meeting #86, R1 166131, August 22-26, 2016, 2 pages.*
(Continued)

*Primary Examiner* — Tesfaldet Bocure
(74) *Attorney, Agent, or Firm* — Fish & Richardson P.C.

(57) ABSTRACT

A method for transmitting, by a terminal, an SRS in a wireless communication system comprises the steps of: receiving, from a base station, control information including SRS resource pool information for tracking a transmission beam of the terminal; and transmitting the SRS to the base station on the basis of the control information, wherein the SRS is an SRS used for tracking the transmission beam of the terminal.

12 Claims, 18 Drawing Sheets

(51) Int. Cl.
  *H04B 7/06* (2006.01)
  *H04W 76/11* (2018.01)
  *H04L 5/00* (2006.01)
  *H04W 72/02* (2009.01)
  *H04W 72/04* (2009.01)

(52) U.S. Cl.
  CPC ......... *H04W 72/02* (2013.01); *H04W 72/046* (2013.01); *H04W 76/11* (2018.02)

(58) Field of Classification Search
  USPC ................. 375/267, 299, 347; 455/101, 132
  See application file for complete search history.

(56) References Cited

U.S. PATENT DOCUMENTS

| | | | | |
|---|---|---|---|---|
| 8,842,554 B2* | 9/2014 | Mehta | ..................... | H04B 7/061 |
| | | | | 370/250 |
| 8,855,053 B2* | 10/2014 | Chen | ..................... | H04L 5/0051 |
| | | | | 370/328 |
| 8,913,684 B2* | 12/2014 | Kim | ..................... | H04L 5/0048 |
| | | | | 375/267 |
| 8,989,302 B2* | 3/2015 | Noh | ..................... | H04L 27/2605 |
| | | | | 375/295 |
| 9,198,159 B2* | 11/2015 | Chen | ..................... | H04L 5/0051 |
| 2017/0331606 A1* | 11/2017 | Chen | ..................... | H04W 76/27 |
| 2017/0366311 A1* | 12/2017 | Iyer | ..................... | H04L 5/0007 |
| 2018/0367273 A1* | 12/2018 | Park | ..................... | H04W 76/34 |

OTHER PUBLICATIONS

PCT International Search Report and Written Opinion in International Application No. PCT/KR2016/011179, dated Jun. 28, 2017, 23 pages (with English translation).

Nokia, Alcatel-Lucent Shanghai Bell, "UL SRS design considerations in NR," R1-1610273, 3GPP TSG-RAN WG1 Meeting #86bis, Lisbon, Portugal, Oct. 10-14, 2016, 3 pages.

LG Electronics, "Discussion on UL sounding signal design for NR," R1-1609285, 3GPP TSG RAN WG1 Meeting #86bis, Lisbon, Portugal, Oct. 10-14, 2016, 4 pages.

Spreadtrum Communications, "Discussion on UL sounding RS design for NR MIMO," R1-1608923, 3GPP TSG RAN WG1 Meeting #86, Lisbon, Portugal, Oct. 10-14, 2016, 3 pages.

* cited by examiner

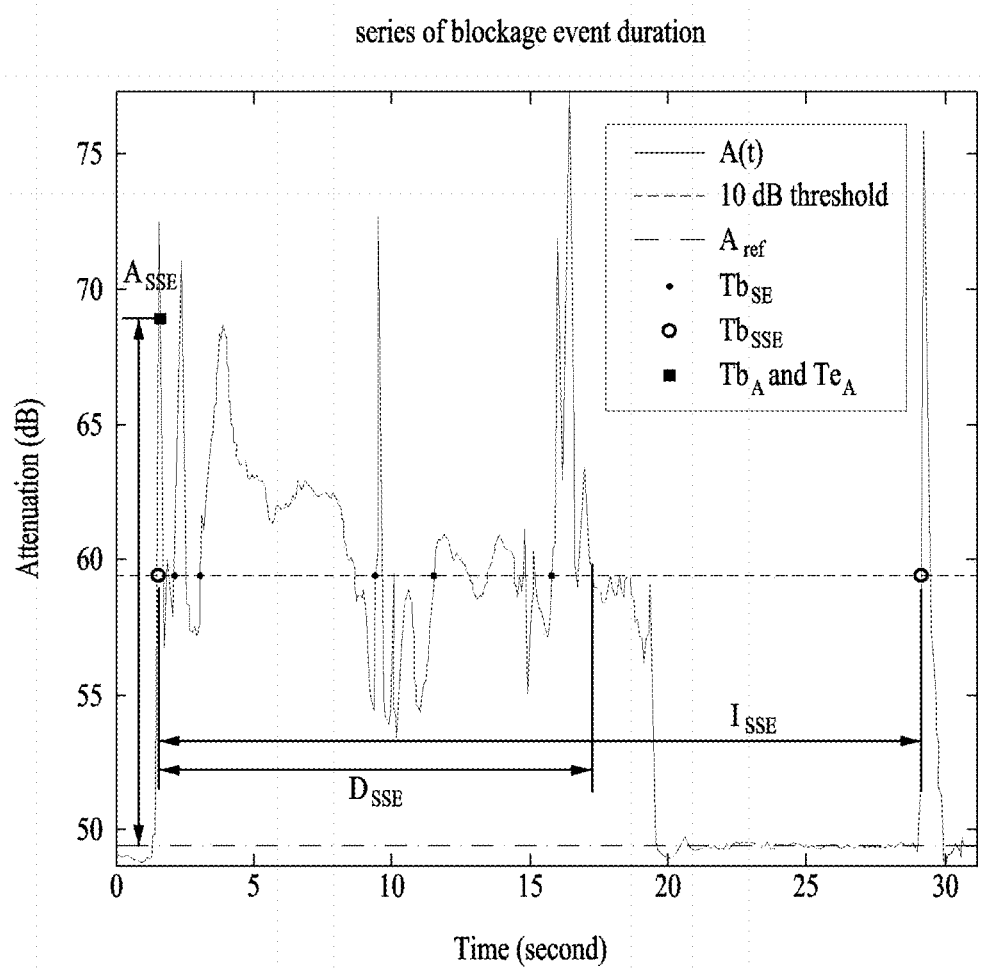

default self contained subframe structure

Resource Pool for SRS
(subframe configured with xPUCCH)

Resource Pool for SRS
(subframe configured without xPUCCH)

FIG. 8
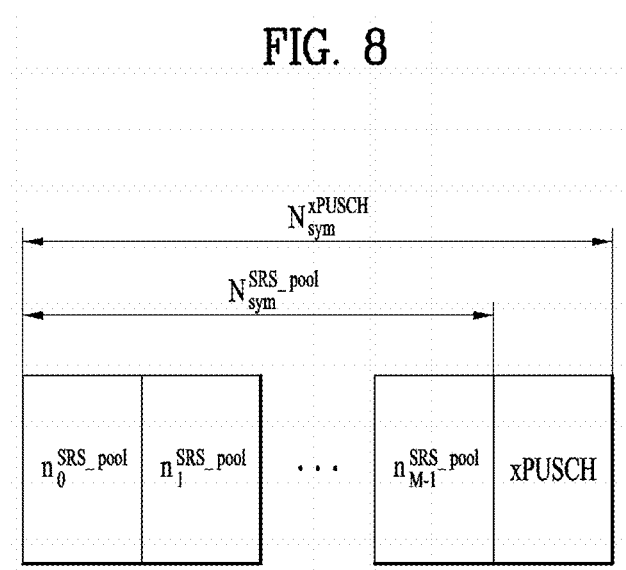
ascending configuration example
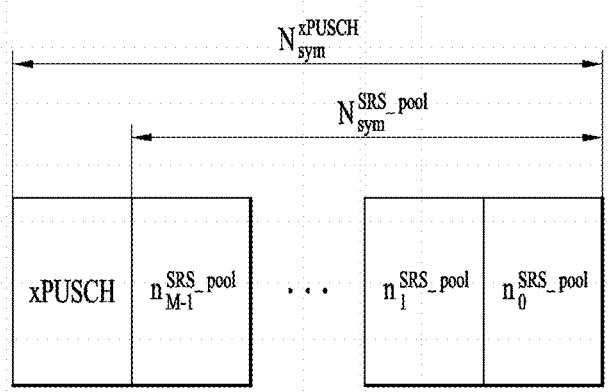
descending configuration example SRS pool signalling example example of SRS resource in SRS pool according to SRS resource UE specific tracking trigger Alt 1-1 example Alt 1-2 example Alt 1-3 example

METHOD FOR TRANSMITTING SRS IN WIRELESS COMMUNICATION SYSTEM AND TERMINAL THEREFOR

CROSS-REFERENCE TO RELATED APPLICATIONS

This application is a National Stage application under 35 U.S.C. § 371 of International Application No. PCT/KR2016/011179, filed on Oct. 6, 2016. The disclosures of the prior applications are incorporated by reference in their entirety.

TECHNICAL FIELD

The present disclosure relates to wireless communication, and more particularly to, a method of transmitting a Sounding Reference Symbol (SRS) in a wireless communication system and terminal therefor.

BACKGROUND

Since a beam scanning process has significant processing overhead, the beam scanning cannot be completed within a very short period. The temporal variation of a channel above 6 GHz is expected to be much faster than that of a channel below 6 GHz due to additional channel elements. In addition, in a cellular system, a Base Station (BS) may have a fixed beam configuration, whereas a terminal may have various beams depending on serving cell locations, changes in its surrounding environment, terminal behavior patterns, etc. That is, a Transmission/Reception (Tx/Rx) beam mismatch is highly likely to occur within a beam scanning period. To overcome the Tx/Rx beam mismatch, a beam tracking method is required.

For beam tracking, SRS transmission is essential. Nevertheless, the SRS transmission for the beam tracking has not been studied in detail yet.

DISCLOSURE OF THE INVENTION

Technical Task

Accordingly, a first object of the present disclosure is to provide a method by which a terminal transmits an SRS in a wireless communication system.

A second object of the present disclosure is to provide a terminal for transmitting an SRS in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

To achieve the first object, provided is a method of transmitting a Sounding Reference Symbol (SRS) by a terminal in a wireless communication system. The method may include: receiving, from a base station, control information including SRS resource pool information for tracking Transmission (Tx) beams of the terminal; and transmitting SRSs to the base station based on the control information. In this case, the SRSs may be used for tracking the Tx beams of the terminal.

The method may further include: receiving, from the base station, uplink resource allocation information and a best Tx beam identifier (ID) of the terminal, which is selected by tracking the Tx beams of the terminal; and transmitting an uplink signal using a Tx beam of the terminal corresponding to the best Tx beam ID of the terminal.

The SRS resource pool information may include symbol size information of an SRS resource pool and start symbol index information of the SRS resource pool.

The control information may include Tx candidate beam identifier (ID) information of the terminal for tracking the Tx beams of the terminal. The SRS resource pool information may further include SRS transmission type information, the SRS transmission type information may indicate an SRS resource pool pattern, and the SRSs may be transmitted based on the SRS resource pool pattern. In this case, the SRS resource pool pattern may be determined based on a transmission comb pattern, whether there is a localized SRS transmission region, or whether there is a full-band SRS transmission region.

To achieve the second object, provided is a terminal for transmitting a Sounding Reference Symbol (SRS) in a wireless communication system. The terminal may include: a receiver; a transmitter; and a processor. The processor may be configured to: control the receiver to receive, from a base station, control information including SRS resource pool information for tracking Transmission (Tx) beams of the terminal; and control the transmitter to transmit SRSs to the base station based on the control information. In this case, the SRSs may be used for tracking the Tx beams of the terminal.

The processor may be configured to: control the receiver to receive, from a base station, uplink resource allocation information and a best Tx beam identifier (ID) of the terminal, which is selected by tracking the Tx beams of the terminal; and control the transmitter to transmit an uplink signal using a Tx beam of the terminal corresponding to the best Tx beam ID of the terminal.

The SRS resource pool information may include symbol size information of an SRS resource pool and start symbol index information of the SRS resource pool. The control information may include Tx candidate beam identifier (ID) information of the terminal for tracking the Tx beams of the terminal. The SRS resource pool information may further include SRS transmission type information, the SRS transmission type information may indicate an SRS resource pool pattern, and the processor may be configured to control the transmitter to transmit the SRSs based on the SRS resource pool pattern. In this case, the SRS resource pool pattern may be determined based on a transmission comb pattern, whether there is a localized SRS transmission region, or whether there is a full-band SRS transmission region.

Advantageous Effects

According to embodiments of the present disclosure, it is possible to reduce signaling overhead that occurs when aperiodic SRS transmission is performed. In addition, it is possible to handle SRS transmission ambiguity caused by subframe types of other systems flexibly by proposing an SRS transmission resource pool.

The effects that can be achieved through the embodiments of the present disclosure are not limited to what has been particularly described hereinabove and other effects which are not described herein can be derived by those skilled in the art from the following detailed description. That is, it should be noted that the effects which are not intended by the present disclosure can be derived by those skilled in the art from the embodiments of the present disclosure.

DESCRIPTION OF DRAWINGS

The accompanying drawings, which are included to provide a further understanding of the invention and are incorporated in and constitute a part of this specification, illustrate embodiments of the invention.

FIG. 2a shows the series of blockage event duration in Table 10 during which important blockages occur.

FIG. 8 is a diagram illustrating SRS transmission symbol indices (configured in ascending and descending order) in an SRS resource pool.

MODE FOR INVENTION

Figure 1:
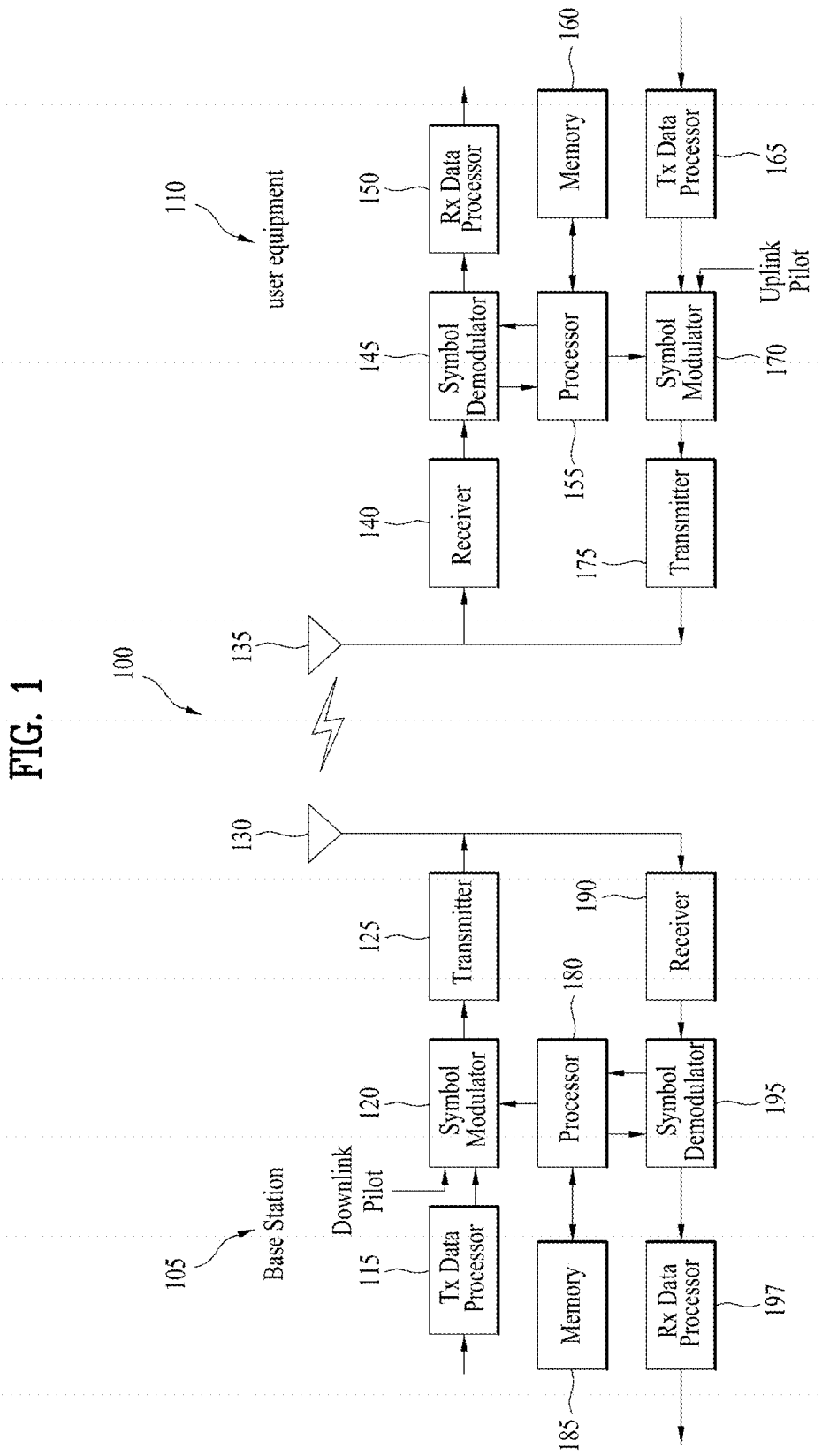
FIG. 1 is a block diagram for configurations of a base station 105 and a user equipment 110 in a wireless communication system 100.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present disclosure supports an MIMO (multiple input multiple output) system. And, the base station 105 according to the present disclosure may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

For UE Tx beam tracking, a UE needs to transmit an SRS for each candidate Tx beam of the UE. However, if SRSs are transmitted toward many beam directions (in accordance with a UE's Tx beam set for all directions), it may result in significant resource waste. Accordingly, the present disclosure proposes a method of performing an adaptive UE Tx beam tracking by performing SRS transmission flexibly according to UE pattern changes.

First, Table 1 below shows details of SRS transmission in the 3GPP LTE/LTE-A system.

Table 3 below shows additional details of the SRS transmission in the 3GPP LTE/LTE-A system.

TABLE 1

A UE shall transmit Sounding Reference Symbol (SRS) on per serving cell SRS resources based on two trigger types:
trigger type 0: higher layer signalling
trigger type 1: DCI formats 0/4/1A for FDD and TDD and DCI formats 2B/2C/2D for TDD.
In case both trigger type 0 and trigger type 1 SRS transmissions would occur in the same subframe in the same serving cell, the UE shall only transmit the trigger type 1 SRS transmission.
A UE may be configured with SRS parameters for trigger type 0 and trigger type 1 on each serving cell. The following SRS parameters are serving cell specific and semi-statically configurable by higher layers for trigger type 0 and for trigger type 1.
Transmission comb $\bar{k}_{TC}$, as defined in subclause 5.5.3.2 of [3] for trigger type 0 and each configuration of trigger type 1
Starting physical resource block assignment $n_{RRC}$, as defined in subclause 5.5.3.2 of [3] for trigger type 0 and each configuration of trigger type 1
duration: single or indefinite (until disabled), as defined in [11] for trigger type 0
srs-ConfigIndex $I_{SRS}$ for SRS periodicity $T_{SRS}$ and SRS subframe offset $T_{offset}$, as defined in Table 8.2-1 and Table 8.2-2 for trigger type 0 and SRS periodicity $T_{SRS, 1}$, and SRS subframe offset $T_{SRS, 1}$, as defined in Table 8.2-4 and Table 8.2-5 trigger type 1
SRS bandwidth $B_{SRS}$, as defined in subclause 5.5.3.2 of [3] for trigger type 0 and each configuration of trigger type 1
Frequency hopping bandwidth, $b_{hop}$, as defined in subclause 5.5.3.2 of [3] for trigger type 0
Cyclic shift $n_{SRS}^{cs}$, as defined in subclause 5.5.3.1 of [3] for trigger type 0 and each configuration of trigger type 1
Number of antenna ports $N_p$ for trigger type 0 and each configuration of trigger type 1
For trigger type 1 and DCI format 4 three sets of SRS parameters, srs-ConfigApDCI-Format4, are configured by higher layer signalling. The 2-bit SRS request field [4] in DCI format 4 indicates the SRS parameter set given in Table 8.1-1. For trigger type 1 and DCI format 0, a single set of SRS parameters, srs-ConfigApDCI-Format0, is configured by higher layer signalling. For trigger type 1 and DCI formats 1A/2B/2C/2D, a single common set of SRS parameters, srs-ConfigApDCI-Format1a2b2c, is configured by higher layer signalling. The SRS request field is 1 bit [4] for DCI formats 0/1A/2B/2C/2D, with a type 1 SRS triggered if the value of the SRS request field is set to '1'.
A 1-bit SRS request field shall be included in DCI formats 0/1A for frame structure type 1 and 0/1A/2B/2C/2D for frame structure type 2 if the UE is configured with SRS parameters for DCI formats 0/1A/2B/2C/2D by higher-layer signalling.

Table 2 below shows SRS request values for trigger type 1 of DCI format 4 in the 3GPP LTE/LTE-A system.

TABLE 2

| Value of SRS request field | Description |
| --- | --- |
| '00' | No type 1 SRS trigger |
| '01' | The 1st SRS parameter set configured by higher layers |
| '10' | The 2nd SRS parameter set configured by higher layers |
| '11' | The 3rd SRS parameter set configured by higher layers |

TABLE 3

The serving cell specific SRS transmission bandwidths $C_{SRS}$ are configured by higher layers. The allowable values are given in subclause 5.5.3.2 of [3].
The serving cell specific SRS transmission sub-frames are configured by higher layers. The allowable values are given in subclause 5.5.3.3 of [3].
For a TDD serving cell, SRS transmissions can occur in UpPTS and uplink subframes of the UL/DL configuration indicated by the higher layer parameter subframe Assignment for the serving cell.
When closed-loop UE transmit antenna selection is enabled for a given serving cell for a UE that supports transmit antenna selection, the index $a(n_{SRS})$, of the UE antenna that transmits the SRS at time $n_{SRS}$ is given by $a(n_{SRS}) = n_{SRS}$ mod 2, for both partial and full sounding bandwidth, and when frequency hopping is disabled (i.e., $b_{hop} \geq B_{SRS}$), TABLE 3-continued $$a(n_{SRS}) = \begin{cases} (n_{SRS} + \lfloor n_{SRS}/2 \rfloor + \beta \cdot \lfloor n_{SRS}/K \rfloor) \bmod 2 & \text{when } K \text{ is even} \\ n_{SRS} \bmod 2 & \text{when } K \text{ is odd} \end{cases},$$

$$\beta = \begin{cases} 1 & \text{where } K \bmod 4 = 0 \\ 0 & \text{otherwise} \end{cases}$$

when frequency hopping is enabled (i.e. $b_{hop} < B_{SRS}$), where values $B_{SRS}$, $b_{hop}$, $N_b$, and $n_{SRS}$ are given in subclause 5.5.3.2 of [3], and $$K = \prod_{b'=b_{hop}}^{B_{SRS}} N_b \text{ (where } N_{b_{hop}} = 1 \text{ regardless of the } N_b \text{ value)},$$

except when a single SRS transmission is configured for the UE. If a UE is configured with more than one serving cell, the UE is not expected to transmit SRS on different antenna ports simultaneously.
A UE may be configured to transmit SRS on Np antenna ports of a serving
cell where Np may be configured by higher layer signalling. For PUSCH transmission mode 1 $N_p \in \{0, 1, 2, 4\}$ and for PUSCH transmission mode 2 $N_p \in \{0, 1, 2\}$ with two antenna ports configured for PUSCH and $N_p \in \{0, 1, 4\}$ with 4 antenna ports configured for PUSCH. A UE configured for SRS transmission on multiple antenna ports of a serving cell shall transmit SRS for all the configured transmit antenna ports within one SC-FDMA symbol of the same subframe of the serving cell.
The SRS transmission bandwidth and starting physical resource block assignment are the same for all the configured antenna ports of a given serving cell.
A UE not configured with multiple TAGs shall not transmit SRS in a symbol whenever SRS and PUSCH transmissions happen to overlap in the same symbol.
For TDD serving cell, when one SC-FDMA symbol exists in UpPTS of the given serving cell, it can be used for SRS transmission. When two SC-FDMA symbols exist in UpPTS of the given serving cell, both can be used for SRS transmission and for trigger type 0 SRS both can be assigned to the same UE.
If a UE is not configured with multiple TAGs, or if a UE is configured with multiple TAGs and SRS and PUCCH format 2/2a/2b happen to coincide in the same subframe in the same serving cell,
The UE shall not transmit type 0 triggered SRS whenever type 0 triggered SRS and PUCCH format 2/2a/2b transmissions happen to coincide in the same subframe;
The UE shall not transmit type 1 triggered SRS whenever type 1 triggered SRS and PUCCH format 2a/2b or format 2 with HARQ-ACK transmissions happen to coincide in the same subframe;
The UE shall not transmit PUCCH format 2 without HARQ-ACK whenever type 1 triggered SRS and PUCCH format 2 without HARQ-ACK transmissions happen to coincide in the same subframe.
If a UE is not configured with multiple TAGs, or if a UE is configured with multiple TAGs and SRS and PUCCH happen to coincide in the same subframe in the same serving cell,
The UE shall not transmit SRS whenever SRS transmission and PUCCH transmission carrying HARQ-ACK and/or positive SR happen to coincide in the same subframe if the parameter ackNackSRS-SimultaneousTransmission is FALSE;
For FDD-TDD and primary cell frame structure 1, the UE shall not transmit SRS in a symbol whenever SRS transmission and PUCCH transmission carrying HARQ-ACK and/or positive SR using shortened format as defined in subclauses 5.4.1 and 5.4.2A of [3] happen to overlap in the same symbol if the parameter ackNackSRS-SimultaneousTransmission is TRUE.
Unless otherwise prohibited, the UE shall transmit SRS whenever SRS transmission and PUCCH transmission carrying HARQ-ACK and/or positive SR using shortened format as defined in subclauses 5.4.1 and 5.4.2A of [3] happen to coincide in the same subframe if the parameter ackNackSRS-SimultaneousTransmission is TRUE.
A UE not configured with multiple TAGs shall not transmit SRS whenever SRS transmission on any serving cells and PUCCH transmission carrying HARQ-ACK and/or positive SR using normal PUCCH format as defined in subclauses 5.4.1 and 5.4.2A of [3] happen to coincide in the same subframe.
In UpPTS, whenever SRS transmission instance overlaps with the PRACH region for preamble format 4 or exceeds the range of uplink system bandwidth configured in the serving cell, the UE shall not transmit SRS.
The parameter ackNackSRS-SimultaneousTransmission provided by higher layers determines if a UE is configured to support the transmission of HARQ-ACK on PUCCH and SRS in one subframe. If it is configured to support the transmission of HARQ-ACK on PUCCH and SRS in one subframe, then in the cell specific SRS subframes of the primary cell UE shall transmit HARQ-ACK and SR using the shortened PUCCH format as defined in subclauses 5.4.1 and 5.4.2A of [3], where the HARQ-ACK or the SR symbol corresponding to the SRS location is punctured.
This shortened PUCCH format shall be used in a cell specific SRS subframe of the primary cell even if the UE does not transmit SRS in that subframe.
The cell specific SRS subframes are defined in subclause 5.5.3.3 of [3]. Otherwise, the UE shall use the normal PUCCH format 1/1a/1b as defined in subclause 5.4.1 of [3] or normal PUCCH format 3 as defined in subclause 5.4.2A of [3] for the transmission of HARQ-ACK and SR.
Trigger type 0 SRS configuration of a UE in a serving cell for SRS periodicity, $T_{SRS}$, and SRS subframe offset, $T_{offset}$, is defined in Table 8.2-1 and Table 8.2-2, for FDD and TDD serving cell, respectively. The periodicity $T_{SRS}$ of the SRS transmission is serving cell specific and is selected from the set $\{2, 5, 10, 20, 40, 80, 160, 320\}$ ms or subframes. For the SRS periodicity $T_{SRS}$ of 2 ms in TDD serving cell, two SRS resources are configured in a half frame containing UL subframe(s) of the given serving cell. Type 0 triggered SRS transmission instances in a given serving cell for TDD serving cell with $T_{SRS} > 2$ and for FDD serving cell are the subframes satisfying $(10 \cdot n_f + k_{SRS} - T_{offset}) \bmod T_{SRS} = 0$, where for FDD $k_{SRS} = \{0, 1, , , , 0\}$ is the subframe index within the frame, for TDD serving cell $k_{SRS}$ is defined in Table 8.2-3. The SRS transmission instances for TDD serving cell with $T_{SRS} = 2$ are the subframes satisfying $k_{SRS} - T_{offset}$.
For TDD serving cell, and a UE configured for type 0 triggered SRS transmission in serving cell c, and the UE configured with the parameter EIMTA-MainConfigServCell-r12 for serving cell c, if the UE does not detect an UL/DL configuration indication for radio frame m (as described in section 13.1), the UE shall not transmit trigger type 0 SRS in a subframe of radio frame m that is indicated by the parameter eimta-HarqReferenceConfig-r12 as a downlink subframe unless the UE transmits PUSCH in the same subframe.
Trigger type 1 SRS configuration of a UE in a serving cell for SRS periodicity, $T_{SRS,1}$, and SRS subframe offset, $T_{offset,1}$, is defined in Table 8.2-4 and Table 8.2-5, for FDD and TDD serving cell, respectively. The periodicity $T_{SRS,1}$ of the SRS transmission is serving cell specific and is selected from the set $\{2, 5, 10\}$ ms or subframes.
For the SRS periodicity $T_{SRS,1}$ of 2 ms in TDD serving cell, two SRS resources are configured in a half frame containing UL subframe(s) of the given serving cell.
A UE configured for type 1 triggered SRS transmission in serving cell c and not configured with a carrier indicator field shall transmit SRS on serving cell c upon detection of a positive SRS request in PDCCH/EPDCCH scheduling PUSCH/PDSCH on serving cell c.
A UE configured for type 1 triggered SRS transmission in serving cell c and configured with a carrier indicator field shall transmit SRS on serving cell c upon detection of a positive SRS request in PDCCH/EPDCCH scheduling PUSCH/PDSCH with the value of carrier indicator field corresponding to serving cell c.
A UE configured for type 1 triggered SRS transmission on serving cell c upon detection of a positive SRS request in subframe n of serving cell c shall commence SRS transmission in the first subframe satisfying $n + k$, $k \geq 4$ and $(10 \cdot n_f + k_{SRS} - T_{offset,1}) \bmod T_{SRS,1} = 0$ for TDD serving cell c with $T_{SRS,1} > 2$ and for FDD serving cell c, $(k_{SRS} - T_{offset,1}) \bmod 5 = 0$ for TDD serving cell c with $T_{SRS,1} = 2$ where for FDD serving cell c
$k_{SRS} = \{0, 1, \ldots, 9\}$ is the subframe index within the frame $n_f$, for TDD serving cell c $k_{SRS}$ is defined in Table 8.2-3.
A UE configured for type 1 triggered SRS transmission is not expected to receive type 1 SRS triggering events associated with different values of trigger type 1 SRS transmission parameters, as configured by higher layer signalling, for the same subframe and the same serving cell.
For TDD serving cell c, and a UE configured with EIMTA-MainConfigServCell-r12 for a serving cell c, the UE shall not transmit SRS in a subframe of a radio frame that is indicated by the corresponding eIMTA-UL/DL-configuration as a downlink subframe.
A UE shall not transmit SRS whenever SRS and a PUSCH transmission corresponding to a Random Access Response Grant or a retransmission of the same transport block as part of the contention based random access procedure coincide in the same subframe.

Table 4 below shows the subframe offset configuration ($T_{offset}$) and UE-specific SRS periodicity ($T_{SRS}$) for trigger type 0 in FDD.

TABLE 4

| SRS Configuration Index $I_{SRS}$ | SRS Periodicity (ms) | SRS subframe Offset |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

Table 5 below shows the subframe offset configuration ($T_{offset}$) and UE-specific SRS periodicity ($T_{SRS}$) for trigger type 0 in TDD.

TABLE 5

| SRS Configuration Index $I_{SRS}$ | SRS Periodicity (ms) | SRS subframe Offset |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

TABLE 6

| SRS Configuration Index $I_{SRS}$ | SRS Periodicity (ms) | SRS subframe Offset |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS} - 10$ |
| 15-24 | 10 | $I_{SRS} - 15$ |
| 25-44 | 20 | $I_{SRS} - 25$ |
| 45-84 | 40 | $I_{SRS} - 45$ |
| 85-164 | 80 | $I_{SRS} - 85$ |
| 165-324 | 160 | $I_{SRS} - 165$ |
| 325-644 | 320 | $I_{SRS} - 325$ |
| 645-1023 | reserved | reserved |

Table 7 shows $k_{SRS}$ for TDD.

TABLE 7

| | subframe index n | | | | | | | | | | |
|---|---|---|---|---|---|---|---|---|---|---|---|
| | 0 | 1 | | 2 | 3 | 4 | 5 | 6 | | 7 | 8 | 9 |
| | | 1st symbol of UpPTS | 2nd symbol of UpPTS | | | | | 1st symbol of UpPTS | 2nd symbol of UpPTS | | | |
| $k_{SRS}$ in case UpPTS length of 2 symbols | 0 | 0 | 1 | 2 | 3 | 4 | 5 | 6 | | 7 | 8 | 9 |
| $k_{SRS}$ in case UpPTS length of 1 symbol | 1 | | | 2 | 3 | 4 | | 6 | | 7 | 8 | 9 |

Table 8 below shows the subframe offset configuration ($T_{offset,1}$) and UE-specific SRS periodicity ($T_{SRS,1}$) for trigger type 1 in FDD.

TABLE 8

| SRS Configuration Index $I_{SRS}$ | SRS Periodicity (ms) | SRS subframe Offset |
|---|---|---|
| 0-1 | 2 | $I_{SRS}$ |
| 2-6 | 5 | $I_{SRS} - 2$ |
| 7-16 | 10 | $I_{SRS} - 7$ |
| 17-31 | reserved | reserved |

Table 9 below shows the subframe offset configuration ($T_{offset,1}$) and UE-specific SRS periodicity ($T_{SRS,1}$) for trigger type 1 in TDD.

TABLE 9

| SRS Configuration Index $I_{SRS}$ | SRS Periodicity (ms) | SRS subframe Offset |
|---|---|---|
| 0 | reserved | reserved |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS} - 10$ |
| 15-24 | 10 | $I_{SRS} - 15$ |
| 25-31 | reserved | reserved |

Table 10 below shows additional channel variation characteristics (blockage effects) of a channel above 6 GHz compared to a channel below 6 GHz.

Meanwhile, when multiple beams are defined to cover a wide area, beam gain may decrease. To solve the above trade-off, additional power gain can be provided by repeat-

TABLE 10

| Ref. | Test description | Tx height | Rx height | Test frequency | Blockage rate relative parameter |
|---|---|---|---|---|---|
| [2] | One blocker moving (1 m/s)Horn(22.4 dBi, 12°)Patch(4.3 dBi/2.2 dBi, 58°) 4 blockers moving | 2.2/1.2 m | 1.2 m | 60 GHz | Series of Blockage event duration(threshold 5 dB) 780~1839 ms(Horn)640~1539 ms(Patch) Series of Blockage event duration(threshold 5 dB)688 ms(Horn, average)278 ms(Patch, average) |
| [5] | 1~15 blockers movingThe horns(22.4 dBi, 12° in azimuth, about 10° in elevation)The patches (about 3 dBi, 60° both in elevation and azimuth. The vertical polarization) | 1.58/2.77 m | 1.55 m | 60 GHz | Series of Blockage event duration (Threshold 10 dB)300 ms(1~5 persons)350 ms(6~10 persons)450 ms(11~15 persons) |
| [6] | — | — | — | 60 GHz | 93 ms(Mean Drop Rate) |
| [7] | One blocker moving(Walking speed)20 dBi, 10° | 1.1 m | 0.75 m | 67 GHz | $t_D$ = 230 ms (average, Threshold 20 dB) |
| [8] | One blocker moving(Walking speed)20 dBi, 10° | 1.1 m | 0.75 m | 67 GHz | $t_D$ = 370 ms~820 ms$t_{decay}$ = 230 ms (mean), 92 ms(s.d)(Threshold 20 dB)$t_{rising}$ = 220 ms (mean), 100 ms(s.d)(Threshold 20 dB) |

Figure 2B:
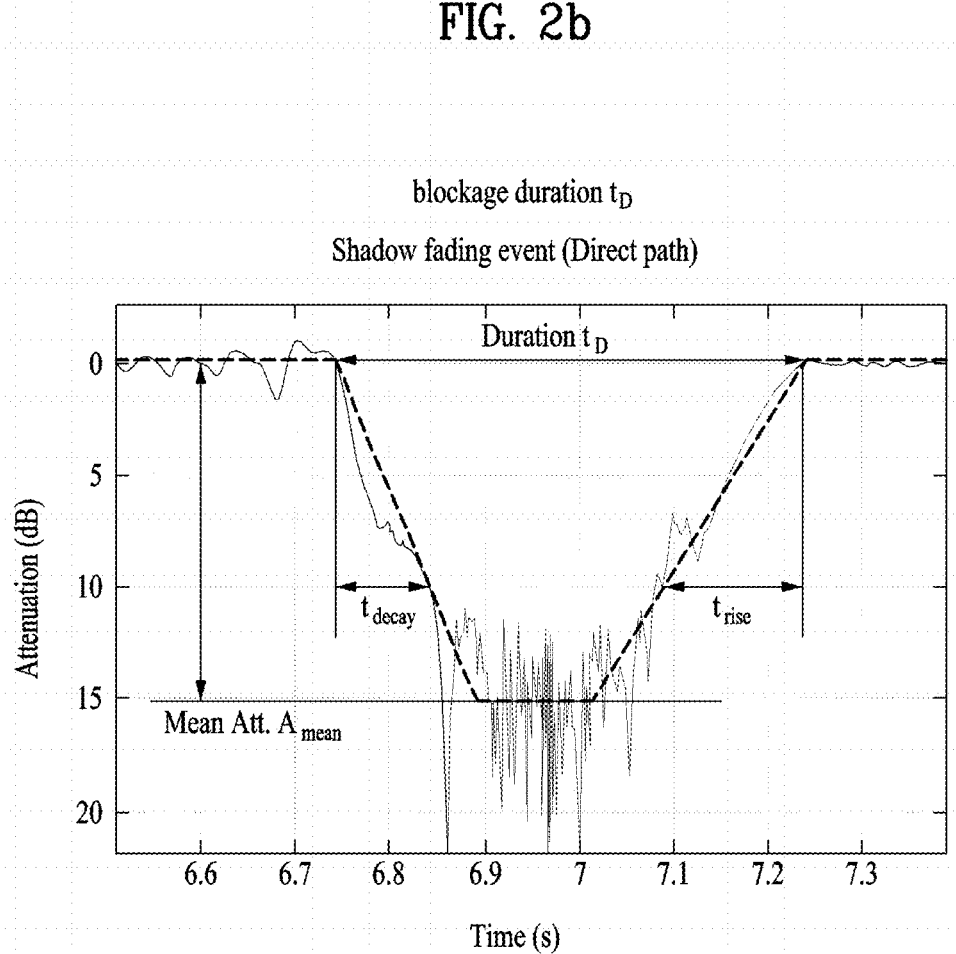
FIG. 2b shows the blockage duration ($t_D$) in Table 2

FIG. 2 is a diagram illustrating blockage duration with reference to Table 10. Specifically, FIG. 2a shows the series of blockage event duration in Table 10 during which important blockages occur, and FIG. 2b shows the blockage duration ($t_D$) in Table 2. That is, the series of blockage event duration indicates the time during which important blockages occur, and $t_D$ indicates the period between occurrence of a blockage and the when blockage ends and the system goes back to a normal state.

Table 11 shows a pattern relationship between a UE and $t_{decay}$ and $t_{rising}$.

TABLE 11

|  | Walking (0.6 m/s)[7] | Sprinting (10 m/s)[9] | Swift Hand swing (43 m/s) |
|---|---|---|---|
| $t_{decay}$, $t_{rising}$ (ms) | 150 ms (measure) | 9 ms (calculation) | 2.093 ms (calculation) |

Although Table 11 shows that a blockage change is basically estimated to about average 100 ms (the speed of a walking obstacle (4 km/h)), it can vary from 2 ms to hundreds of ms depending on UE's patterns and surrounding environments.

Necessity for Beam Tracking

Figure 3:
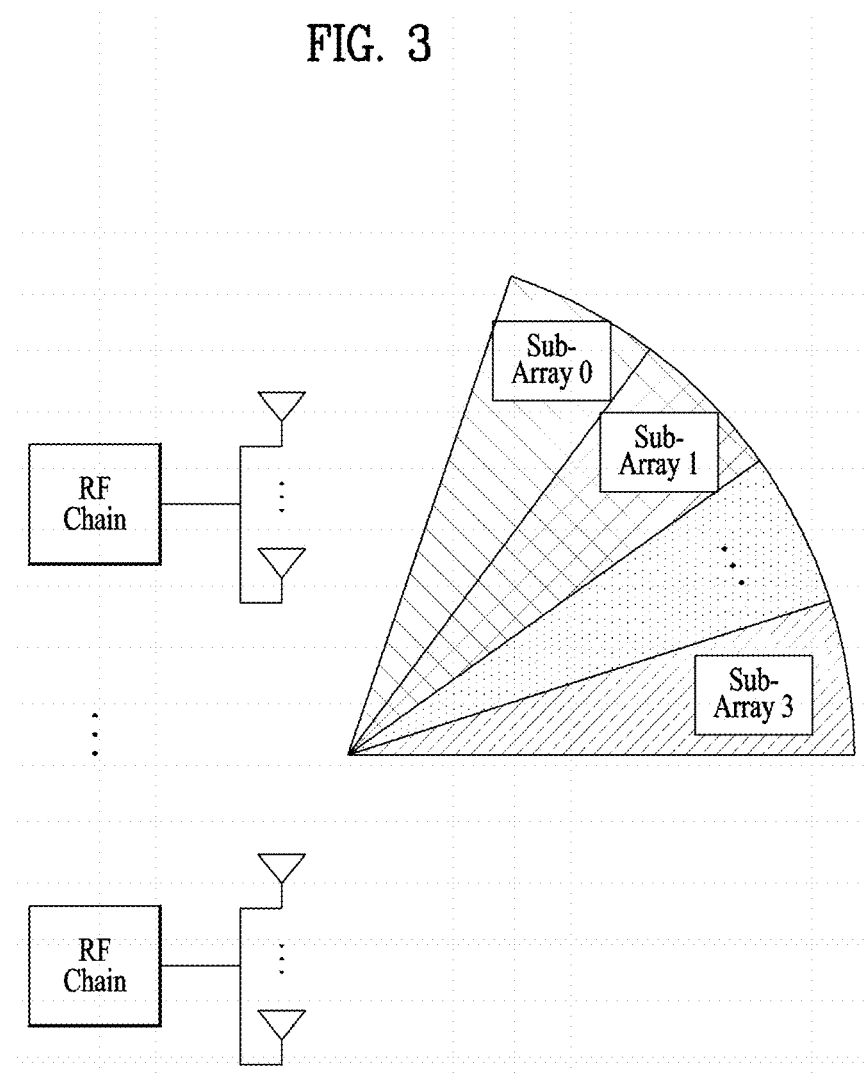
FIG. 3 is a diagram illustrating a wide beam composed of four narrow beams.

When multiple beams are properly placed, a wide beam can be defined as shown in FIG. 3.

FIG. 3 is a diagram illustrating a wide beam composed of four narrow beams.

Referring to FIG. 3, the wide beam is defined using four sub-arrays. The present disclosure assumes that a transmitter transmits a synchronization signal using the wide beam. In other words, it is assumed that the same Primary Synchronization Signal/Secondary Synchronization Signal/Physical Broadcast Channel (PSS/SSS/PBCH) is transmitted on all sub-arrays.

ing transmission in the time domain. Based on the repeated transmission, a structure of a synchronization subframe may be shown in FIG. 4.

Figure 4:
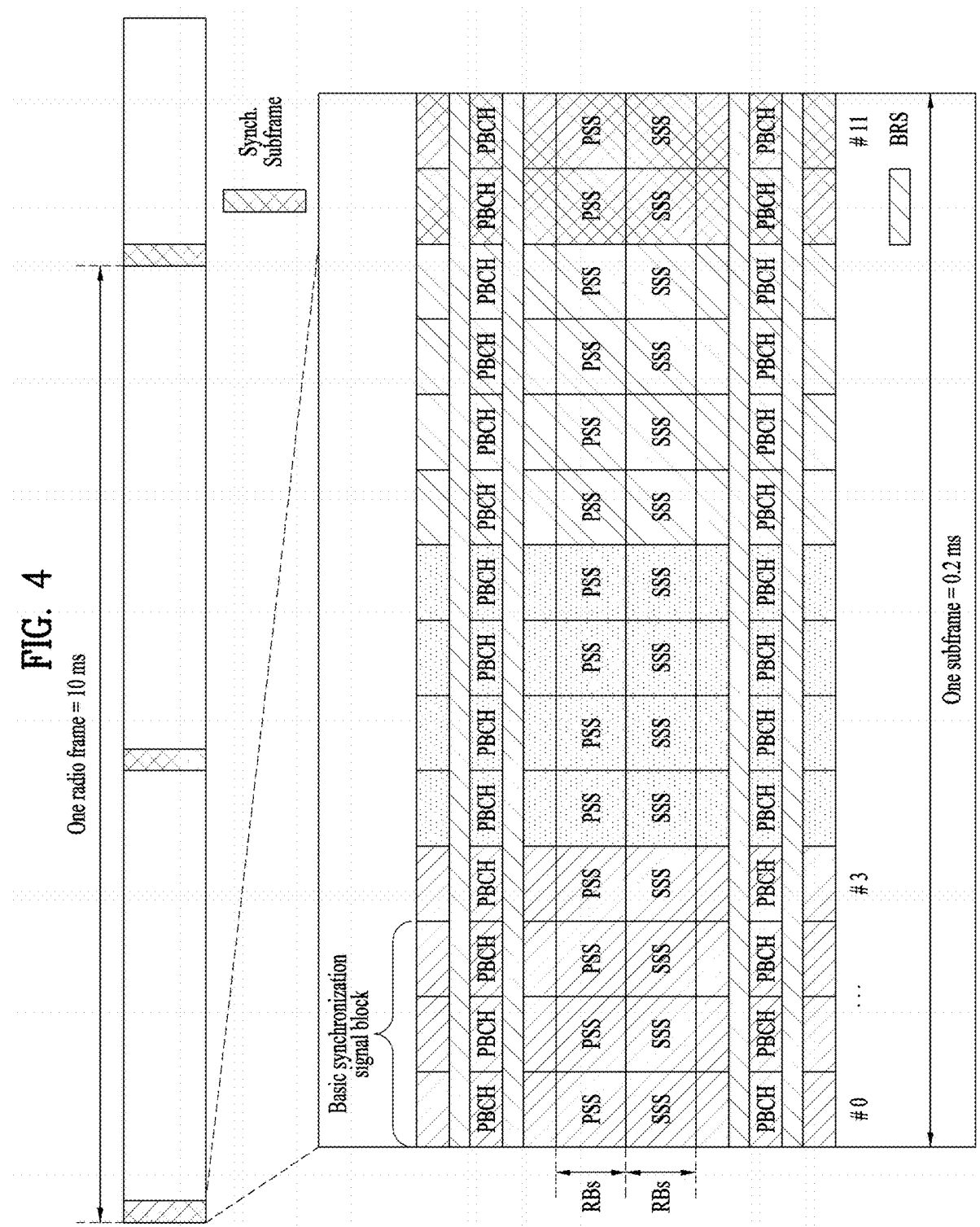
FIG. 4 is a diagram illustrating the structure of a synchronization subframe.

FIG. 4 is a diagram illustrating the structure of a synchronization subframe.

Figure 5:
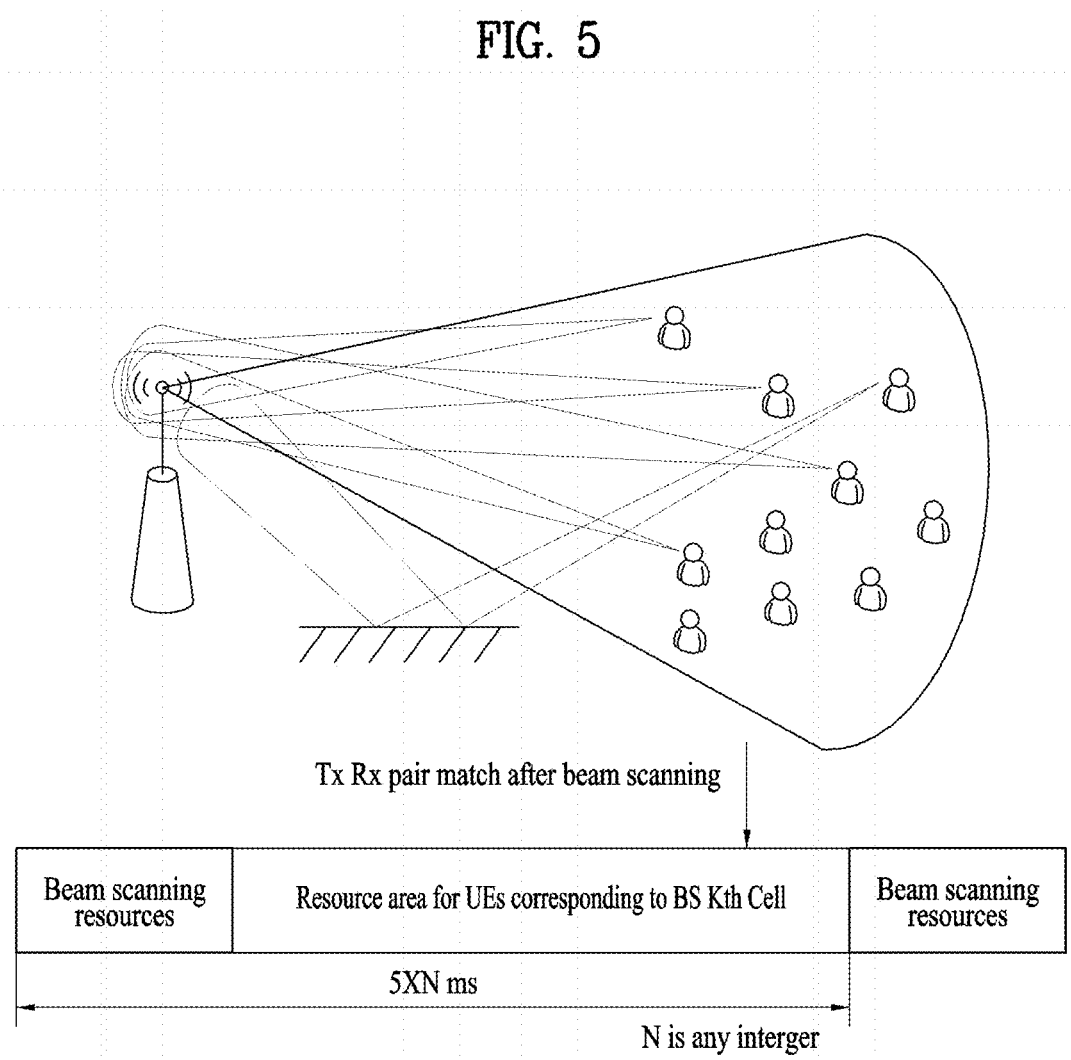
FIG. 5 is a diagram illustrating a beam scanning period and a resource area (for example, 5λN ms period).

Specifically, FIG. 4 shows not only the structure of the synchronization subframe but also PSS/SSS/PBCH defined therein. In FIG. 5, blocks with the same type of hatching indicate a group of Orthogonal Frequency Division Multiplexing (OFDM) symbols where the same RF beam group (defined using four sub-array beams) is applied. That is, four OFDM symbols use the same multi-RF beam. In new RAT, based on the structure of FIG. 4, a beam scanning period can be generally configured as shown in FIG. 4.

FIG. 5 is a diagram illustrating a beam scanning period and a resource area (for example, 5×N ms period).

Since a beam scanning process basically has significant processing overhead, beam scanning cannot be completed within a very short period. In addition, the temporal variation of a channel above 6 GHz is expected to be much faster than that of a channel below 6 GHz due to the aforementioned additional channel elements. Moreover, in a cellular system, a Base Station (BS) may have a fixed beam configuration, whereas a UE may have different beams depending on serving cell locations, changes in its surrounding environment, UE behavior patterns, etc. That is, a Tx/Rx beam mismatch is highly likely to occur within a beam scanning period. To overcome the Tx/Rx beam mismatch, a beam tracking method is required.

In the case of downlink transmission, beam tracking can be performed by applying a UE Rx beam to each of the BRS(Beam Reference Signal)s shown in FIG. 4 and measuring Reference Signal Received Power (RSRP) thereof. If reciprocity is established between Tx/Rx beam pairs (i.e., BS Tx beam/UE Rx beam pair and UE Tx beam/BS Rx beam pair) for downlink transmission, a Tx/Rx beam pair obtained from each BRS can be applied to uplink transmission. Otherwise, an SRS may be used for uplink transmission. To achieve the most powerful uplink beam tracking, SRSs should be transmitted for all Tx beam IDs of each UE. However, this SRS transmission may decrease a Physical Uplink Shared Channel (PUSCH) transmission region, and thus uplink throughput may decrease.

The frame structure shown in Table 12 may have at least one of the following features a) to d): a) a subframe includes a downlink control channel and a downlink data channel; b) a subframe includes a downlink control channel, a downlink data channel, and an uplink control channel; c) a subframe includes a downlink control channel and an uplink control channel; and d) a subframe includes a downlink control channel, an uplink data channel, and an uplink control channel.

TABLE 12

| config-urations | Symbol index | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | Dc | Dd | Dd | Dd | Dd | Dd | Dd | Dd | Dd | Dd | Dd | Dd | Dd CSI-RS | Dd CSI-RS |
| 1 | Dc | Dd | Dd | Dd | Dd | Dd | Dd | Dd | Dd | Dd | Dd | Dd | GP | Uc SRS |
| 2 | Dc | Dc | Dd | Dd | Dd | Dd | Dd | Dd | Dd | Dd | Dd | Dd | Dd CSI-RS | Dd CSI-RS |
| 3 | Dc | Dc | Dd | Dd | Dd | Dd | Dd | Dd | Dd | Dd | Dd | Dd | GP | Uc SRS |
| 4 | Dc | GP | Ud | Ud | Ud | Ud | Ud | Ud | Ud | Ud | Ud | Ud | Ud | Ud |
| 5 | Dc | GP | Ud | Ud | Ud | Ud | Ud | Ud | Ud | Ud | Ud | Ud | Ud | Uc SRS |
| 6 | Dc | GP | Ud | Ud | Ud | Ud | Ud | Ud | Ud | Ud | Ud | Ud | Ud | CSI-RS |
| 7 | Dc | GP | Ud | Ud | Ud | Ud | Ud | Ud | Ud | Ud | Ud | Ud | SRS | CSI-RS |
| 8 | Dc | GP | Ud | Ud | Ud | Ud | Ud | Ud | Ud | Ud | Ud | Ud | SRS | Uc |

Figure 6:
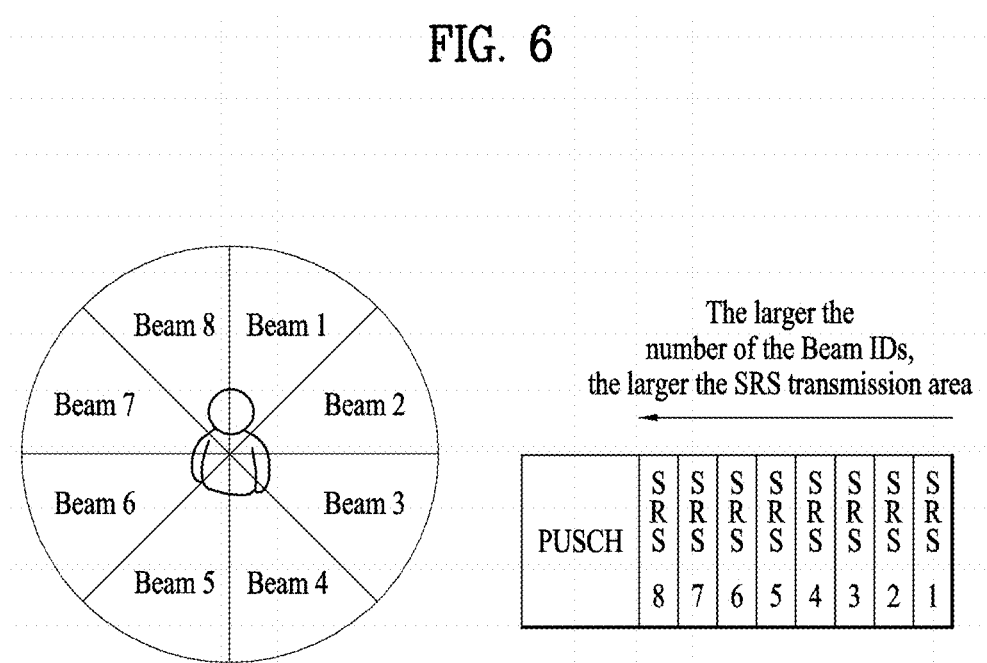
FIG. 6 is a diagram transmission of SRSs corresponding to UE beam IDs (the number of UE Tx beam IDs=8).

FIG. 6 is a diagram transmission of SRSs corresponding to UE beam IDs (the number of UE Tx beam IDs=8).

It can be seen from FIG. 6 that as the number of UE beam IDs increases, the SRS transmission region increases. If periodic SRS transmission is introduced to beam tracking for matching a pair of UE Tx beams and BS RX beams, that is, for establishing UE Tx/BS Rx beam pairs, the number of SRSs for fixed UE Tx candidate beams may be configured by higher layers (for example, a BS may inform the number of SRS transmissions for the fixed UE Tx candidate beams via higher layer signaling (e.g., RRC signaling)). However, if aperiodic SRS transmission is introduced, an additional SRS transmission region is required for additional UE Tx candidate beams. In addition, as the aperiodic SRS transmission is triggered by a UE or a BS, an SRS transmission configuration, which is generated for aperiodic beam tracking, may be presented differently in each beam tracking subframe. Moreover, signaling information for the beam tracking should be provided to UEs whenever the aperiodic SRS transmission is triggered. As a result, signaling overhead may increase. Therefore, a method of efficiently arranging an SRS transmission region and a PUSCH transmission region and a method of reducing signaling overhead thereof are required.

Embodiment 1

An SRS transmission pool (or transmission region) is configured to allocate resources for aperiodic SRS transmission. In this case, it is assumed that BS's Tx and Rx beams are not changed in a subframe for UE Tx tracking.

Table 12 below shows a structure of a frame according to an embodiment of the present disclosure.

In Table 12 below, Dc, Dd, GP, Uc, and Ud indicate a downlink control channel, a downlink data channel, a guard symbol, an uplink control channel, and an uplink data channel, respectively. The remaining parts correspond to Reference Signals (RSs).

Figure 7A:
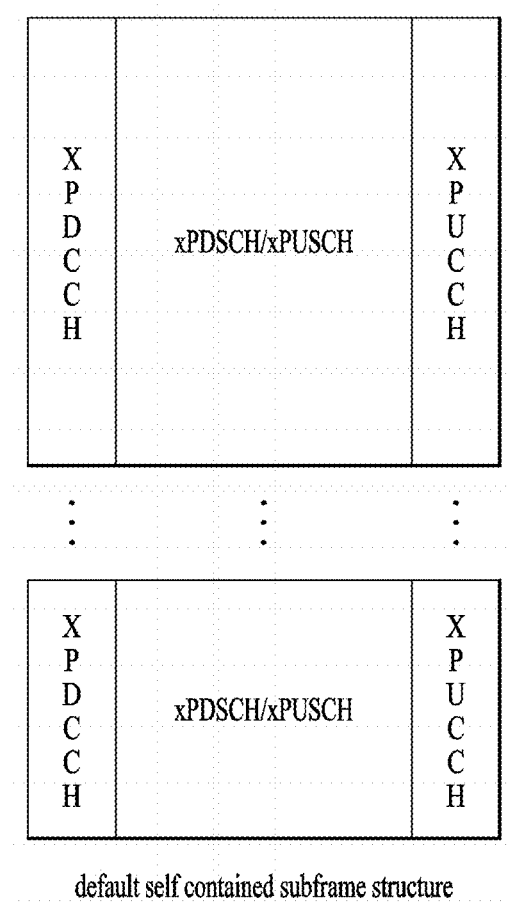
FIG. 7 is a diagram illustrating the configuration of an SRS transmission resource pool in a self-contained subframe structure.
Figure 7B:
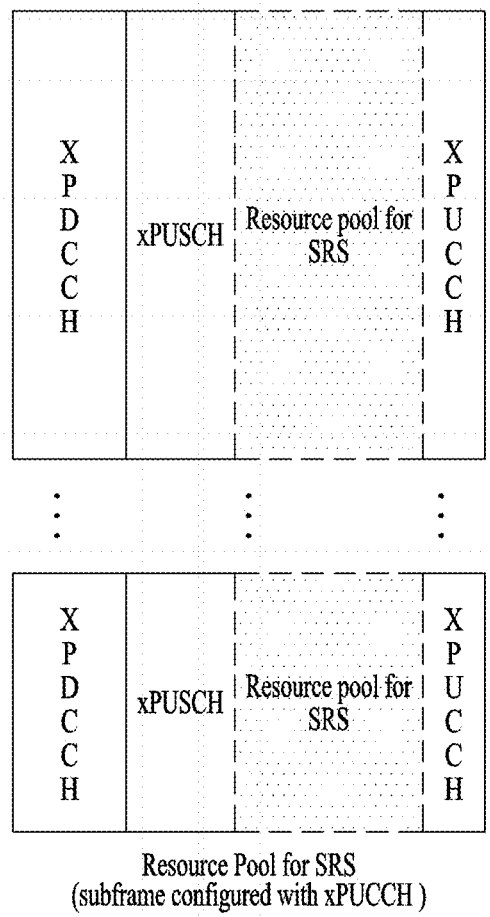
Figure 7C:
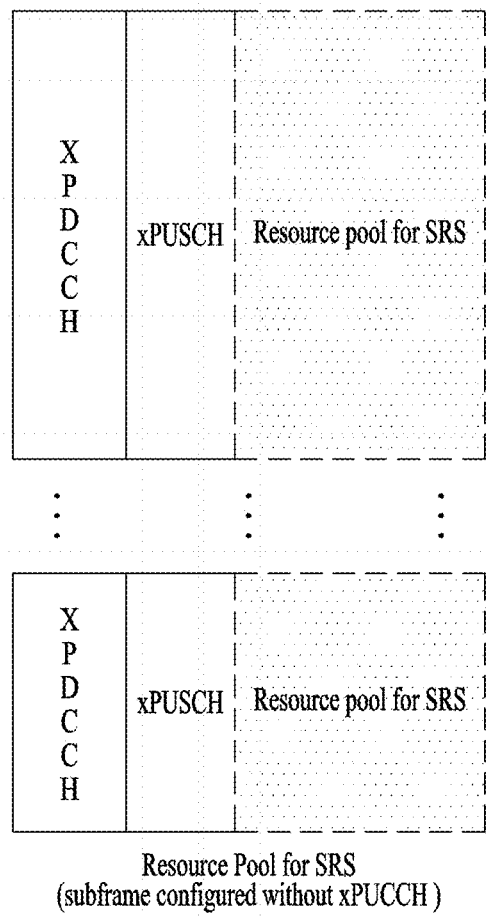

FIG. 7 is a diagram illustrating the configuration of an SRS transmission resource pool in a self-contained subframe structure. Specifically, FIG. 7a shows a basic(default) self-contained subframe structure, FIG. 7b shows an SRS transmission resource pool (when an xPUCCH is configured), and FIG. 7c shows an SRS transmission resource pool.

FIG. 7a shows the basic(default) self-contained subframe structure. In this case, a physical downlink control channel (e.g., xPDCCH) may be located from the first symbol of the subframe to a predetermined number of symbols of the subframe, and a physical uplink control channel (e.g., xPUCCH) may be located across a predetermined number of symbols including the last symbol of the subframe. In addition, a physical downlink shared channel (e.g., xPDSCH) corresponding to a downlink data channel and a physical uplink shared channel (e.g., xPUSCH) corresponding to an uplink data channel may be located between the xPDCCH and the xPUCCH.

Referring to FIG. 7b, when resources for a physical uplink shared channel (e.g., xPUSCH) corresponding to an uplink data channel are located after a physical downlink control channel (e.g., xPDCCH) and resources for a physical uplink control channel (e.g., xPUCCH) are located in the last symbol within one subframe, the resource pool for the SRS transmission may be configured in front of the xPUCCH.

Alternatively, referring to FIG. 7c, when no xPUCCH is configured or scheduled by a Downlink Control Information (DCI) format included in the xPDCCH, the resource region for the SRS transmission may be configured from the last symbol.

The locations of the channels, i.e., xPDCCH, xPUSCH, and xPUCCH may vary depending on subframe types. However, the size of the SRS transmission pool should satisfy the condition of $N_{sym}^{SRS\_pool} \leq N_{sym}^{xPUSCH}$, where $N_{sym}^{SRS\_pool}$ is the total number of SRS symbols that can be allocated to the SRS resource pool and $N_{sym}^{xPUSCH}$ is the number of xPUSCH symbols in the corresponding subframe. In this case, a gap symbol(s) may be configured between the xPDCCH symbols and xPUSCH symbols.

The default configuration of the basic SRS resource pool may mean that all symbols in the SRS resource pool are used for xPUSCH transmission. Hereinafter, how the size of an SRS transmission resource pool is configured will be described with reference to an embodiment thereof. Table 13 below shows examples for SRS resource pool sizes.

TABLE 13

| Configuration | a number of symbols $N_{sym}^{SRS\_pool}$ in a SRS pool |
|---|---|
| 0 | 0 |
| 1 | 2 |
| 2 | 4 |
| 3 | 8 |

When an SRS resource pool size is configured as shown in Table 13, if the equation of $N_{sym}^{xPUSCH}=10$ is satisfied in the case of configuration 3, the condition of $N_{sym}^{SRS\_pool} \leq N_{sym}^{xPUSCH}$ can be satisfied. Consequently, the resource pool can be used.

Hereinafter, a method of transmitting SRS symbols in an SRS resource pool will be described (with reference to examples of ascending and descending order).

FIG. 8 is a diagram illustrating SRS transmission symbol indexes (configured in ascending and descending order) in an SRS resource pool.

When an SRS resource pool is able to be configured in ascending or descending order as shown in FIG. 8, a BS may transmit an indicator indicating the SRS resource pool configuration (e.g., ascending order setting, descending order setting, etc.) to a UE or predetermine the SRS resource pool configuration through a System Information Block (SIB). In this case, SRS symbol transmission locations in the corresponding pool may be determined based on $n_0^{SRS\_pool}$. Alternatively, the SRS symbol transmission locations in the corresponding pool may be configured by higher layers. The BS may inform the UE the SRS symbol transmission locations through higher layer signaling (e.g., RRC signaling).

Figure 9:
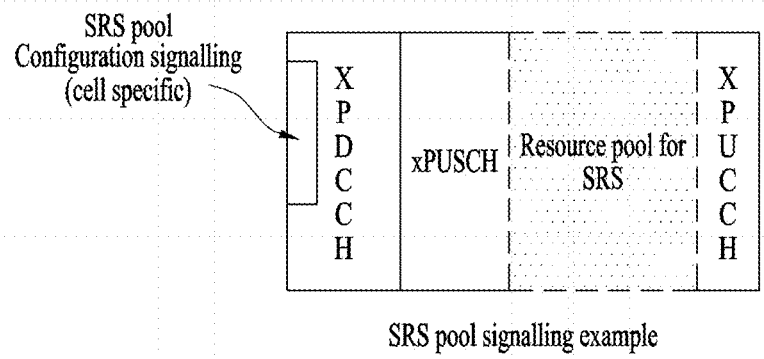
FIG. 9 is a diagram illustrating a method of signaling an SRS resource pool.

FIG. 9 is a diagram illustrating a method of signaling an SRS resource pool.

Specifically, FIG. 9 shows a method by which a BS transmits SRS resource pool configuration information to a UE on a cell-specific xPDCCH. In this case, the SRS resource pool configuration information or information on the SRS resource pool can be signaled not only through cell-specific xPDCCH but also via higher layer signaling.

Information which is transmitted by a BS to indicate an SRS resource pool for UE Tx beam tracking (on a cell-specific xPDCCH or via higher layer signaling) may include the following information: 1, 2, and 3.

1. SRS resource pool type indicator: The indicator may increase depending on the number of pool types. For example, if there are only two resource pool types: ascending order and descending order, one modulated bit can sufficiently indicate the value of '0' or '1'.

2. SRS resource pool start symbol index or SRS resource pool start index depending on pool types 3. SRS resource pool size, $N_{sym}^{SRS\_pool}$ or SRS resource pool size depending on pool types If the BS triggers SRS transmission for the beam tracking, the number of SRS transmission symbols in the corresponding SRS resource pool can be represented using $n_l^{SRS\_pool}$ where l=1+1. Thus, the entire SRS transmission symbol set in a beam tracking subframe can be represented as $\{n_0^{SRS\_pool}, \ldots, n_l^{SRS\_pool}\}$.

The SRS resource pool and corresponding SRS transmission symbols therein can be initialized at every beam scanning. Alternatively, the initialization can be indicated by higher layers.

In the case of $N_{sym}^{SRS\_pool}<1$, additional SRS transmission is not allowed even if the beam tracking is triggered. However, the BS may provide relevant feedback (e.g., 1-bit feedback) to each UE over an xPUSCH in a UE-specific manner.

The BS may transmit UE Tx beam candidate configuration information to a UE on a UE-specific xPDCCH. In a cell, each UE has different Tx beam candidates. Thus, when the BS requires additional SRS transmission, the BS may transmit relevant UE Tx beam candidates on an xPDCCH in a UE-specific manner. The UE Tx beam candidate may correspond to a UE Rx beam index among good BS Tx beam/UE Rx beam pairs except the UE Rx beam paired with the current BS Tx beam during beam scanning.

According to an SRS symbol transmission rule, an SRS resource pool may have a different SRS transmission type depending on system requirements. Hereinafter, SRS transmission types will be described. Assuming that in one beam tracking subframe, a symbol with a maximum number of candidate beams for beam tracking is defined as $n_{sym}^{SRS\_max}$ and a symbol with a minimum number of candidate beams is defined as $n_{sym}^{SRS\_min}$, SRS resources can be allocated as shown in FIG. 10.

Figure 10:
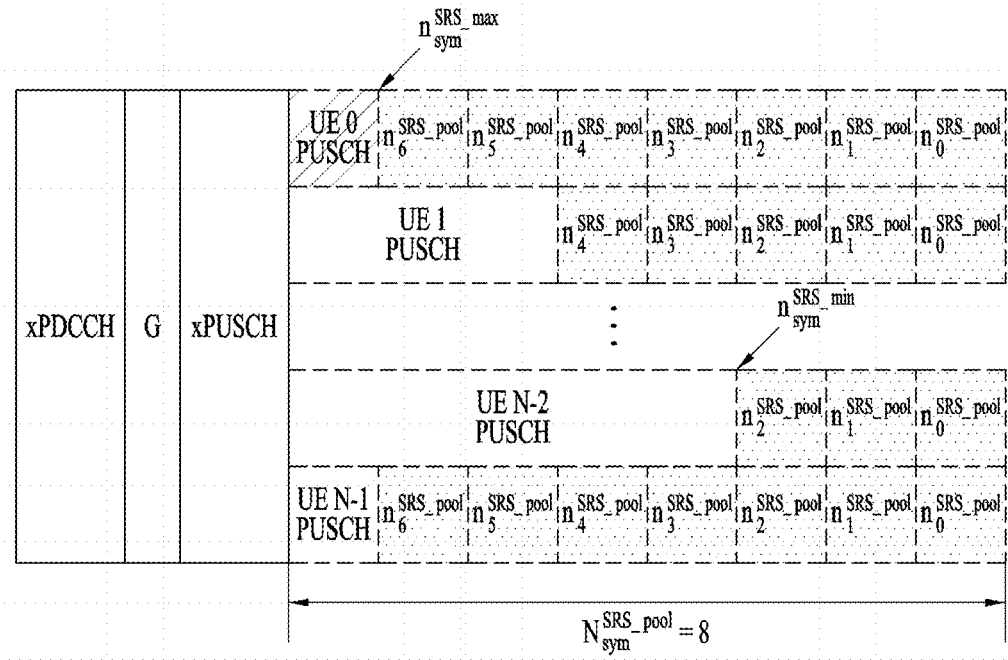
FIG. 10 is a diagram SRS resource pools according to UE-specific beam tracking triggering ($N_{sym}^{SRS\_pool}=8$ in the case of UL FDMA).

FIG. 10 is a diagram illustrating SRS resource pools according to UE-specific beam tracking triggering $N_{sym}^{SRS\_pool}=8$ in the case of UL FDMA).

Specifically, FIG. 10 shows SRS resources in the SRS pools according to the UE-specific beam tracking triggering. UE 0 has the largest SRS resource pool, and UE N-2 has the smallest SRS resource pool.

Figure 11:
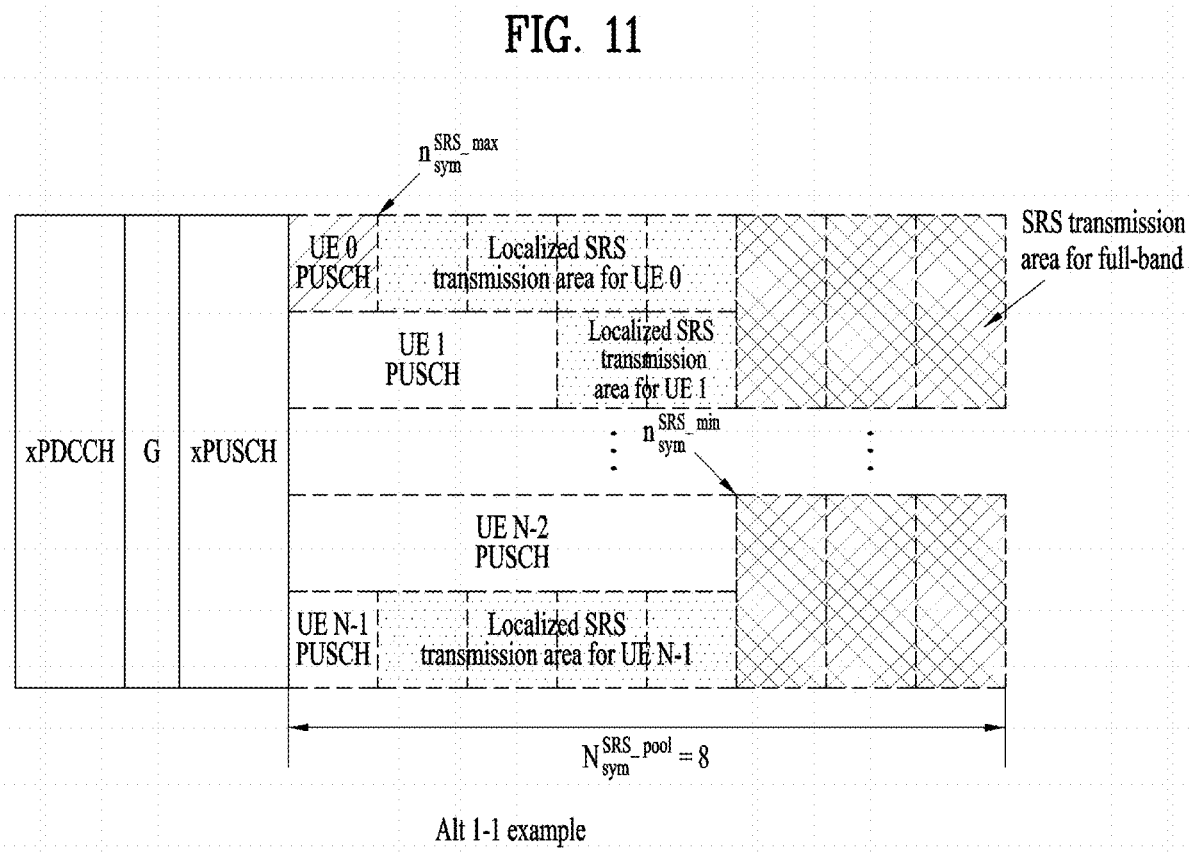
FIG. 11 is a diagram illustrating SRS resources in accordance with SRS transmission type 0 (basic type in the case of UL FDMA).

FIG. 11 is a diagram illustrating SRS resources in accordance with SRS transmission type 0 (basic type in the case of UL FDMA).

Referring to FIG. 11, an SRS resource pool according to SRS transmission type 0 can include both a localized SRS transmission region and a full-band SRS transmission region. Specifically, symbols from symbol $n_0^{SRS\_pool}$ to symbol $n_{sym}^{SRS\_min}$ may be configured for full-band (or full-bandwidth) transmission (including UL resource allocation). In addition, a UE-specific SRS transmission region composed of symbols from $n_{sym}^{SRS\_min}$ to $n_{sym}^{SRS\_max}$ may be set to the localized SRS transmission region. In this case, a BS may inform each UE about the location of xPUSCH resources for each UE in an SRS transmission resource pool. The BS may transmit, to each UE corresponding to SRS transmission type 0, information on its localized SRS transmission region (e.g., the start symbol index of the localized SRS transmission) and/or information on the full-band SRS transmission region (e.g., the start symbol index of the full-band SRS transmission).

Figure 12:
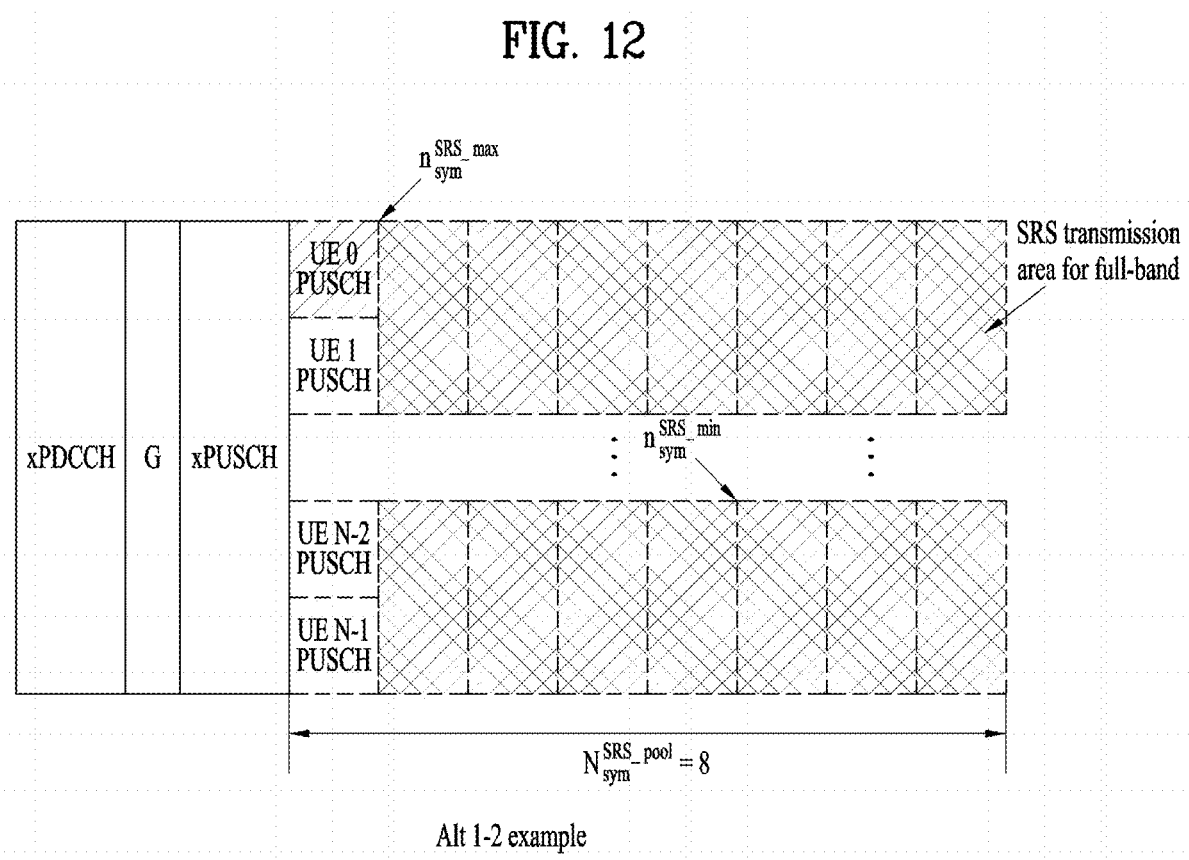
FIG. 12 is a diagram illustrating SRS resources in accordance with SRS transmission type 1 (in the case of UL FDMA).

FIG. 12 is a diagram illustrating SRS resources in accordance with SRS transmission type 1 (in the case of UL FDMA).

Referring to FIG. 12, an SRS resource pool according to SRS transmission type 1 can include only a full-band SRS transmission region. Specifically, symbols up to symbol $n_{sym}^{SRS\_max}$ may be configured for full-band SRS transmission. In this case, a BS may inform UEs in a cell about the location of symbol $n_{sym}^{SRS\_max}$ using a cell-specific xPDCCH. The SRS resource pool shown in FIG. 12 can be used to emphasize beam tracking. In the SRS resource pool, xPUSCH resources can be used from symbols after symbol $n_{sym}^{SRS\_max}$.

Figure 13:
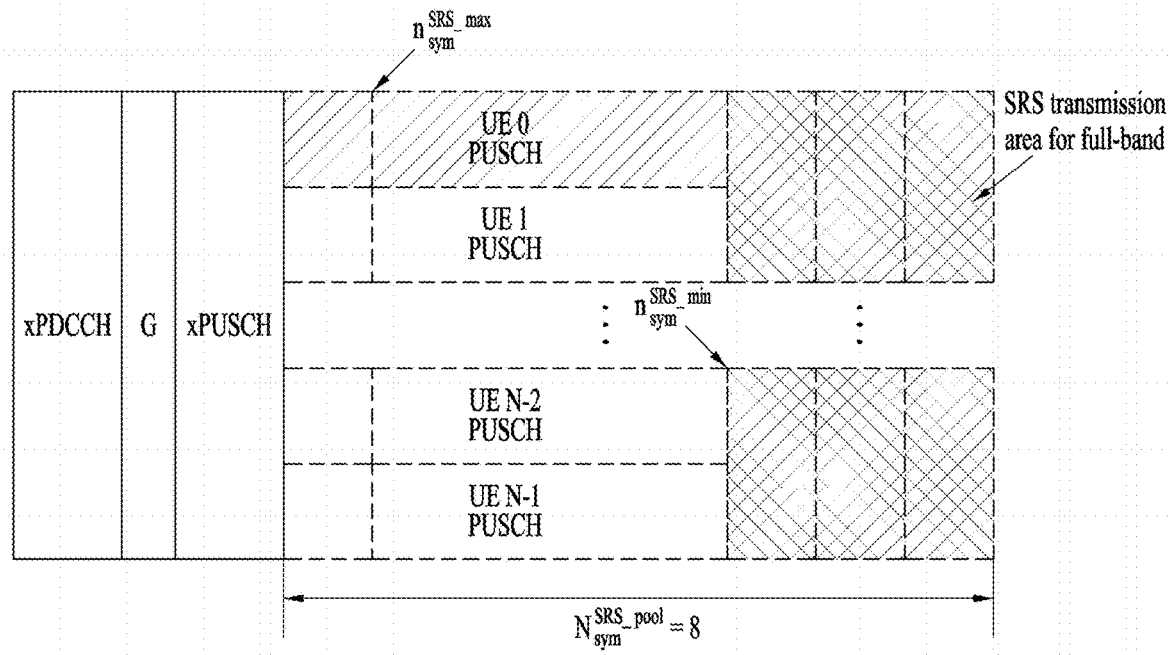
FIG. 13 is a diagram illustrating SRS resources in accordance with SRS transmission type 2 (in the case UL FDMA).

FIG. 13 is a diagram illustrating SRS resources in accordance with SRS transmission type 2 (in the case UL FDMA).

Referring to FIG. 13, an SRS resource pool according to SRS transmission type 2 can include only a full-band SRS transmission region. Specifically, symbols up to symbol $n_{sym}^{SRS\_min}$ may be configured for full-band SRS transmission. In this case, a BS may inform UEs in a cell about the location of symbol $n_{sym}^{SRS\_min}$ using a cell-specific xPDCCH. Even if the UE Tx beam tracking is triggered, symbols beyond symbol $n_{sym}^{SRS\_min}$ are excluded. Therefore, the SRS resource pool according to SRS transmission type 2 can be used when uplink resource transmission is more important.

In the SRS transmission types illustrated in FIGS. 11 to 13, hatched resource regions represented as the localized SRS transmission region can be used only for the UE Tx beam tracking, and hatched regions represented as the full-band SRS transmission region can be used for both the beam tracking and uplink resource allocation (that is, both localized-type transmission and comb-type transmission are possible).

Table 14 below summarizes SRS types.

TABLE 14

| SRS type | description |
| --- | --- |
| 0 | Default |
| 1 | a type emphasized in beam tracking |
| 2 | a type emphasized in xPUSCH resource allocation |
| 3 | Reserved |

Hereinafter, aperiodic SRS transmission methods (BS triggering method and UE triggering method) will be described.

Figure 14:
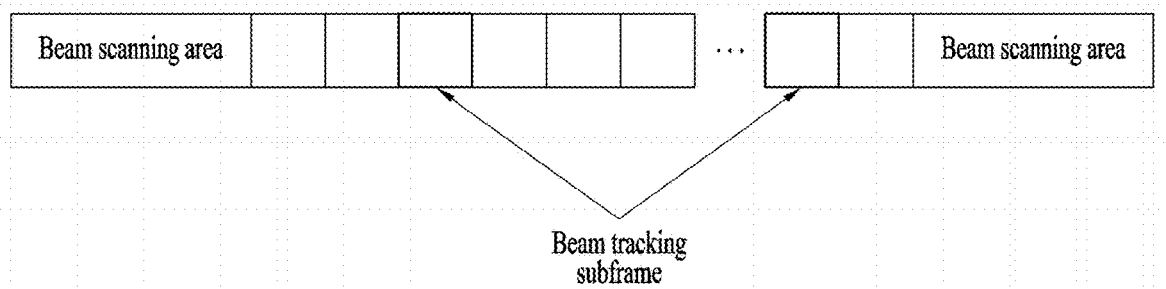
FIG. 14 is a diagram illustrating an assumption for selection of a beam tracking subframe.

FIG. 14 is a diagram illustrating an assumption for selection of a beam tracking subframe.

Referring to FIG. 14, a beam tracking subframe for aperiodic SRS transmission may be configured by higher layers (it is signaled to a UE through higher layer signaling). Alternatively, it may be configured using a method of selecting a periodic SRS transmission subframe.

Figure 15:
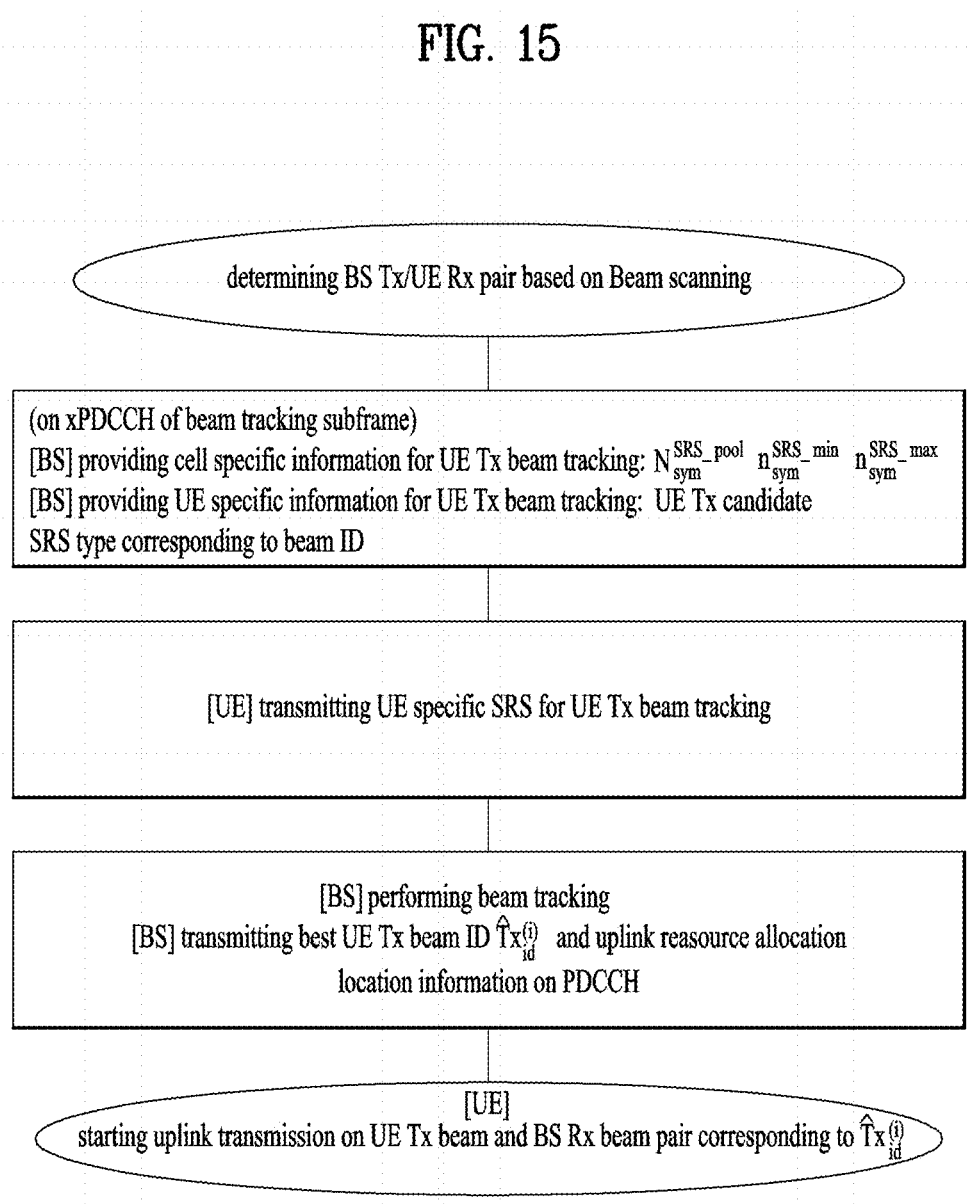
FIG. 15 is a flowchart illustrating aperiodic SRS transmission triggered by a BS.

FIG. 15 is a flowchart illustrating aperiodic SRS transmission triggered by a BS.

Referring to FIG. 15, a UE may determine BS Tx beam/UE Rx beam pairs through beam scanning together with the BS. The BS may transmit, to the UE, cell-specific information for the UE Tx beam tracking (e.g., an SRS resource pool size, $n_{sym}^{SRS\_pool}$, $n_{sym}^{SRS\_max}$, $n_{sym}^{SRS\_min}$, etc.) on an xPDCCH in a beam tracking subframe. In addition, the BS may transmit, to the UE, UE-specific information for the UE Tx beam tracking (e.g., an SRS type corresponding to a UE Tx candidate beam ID) on the xPDCCH in the beam tracking subframe. The SRS type in the UE-specific information indicates an SRS transmission state and can be determined by a transmission comb pattern, whether there is localized SRS transmission, or whether there is full-band SRS transmission.

The UE transmits UE-specific SRSs for the UE Tx beam tracking, and the BS starts the beam tracking. After performing the beam tracking, the BS may transmit the ID of the best UE Tx beam ($(\widehat{Tx}_{id}^{(i)}{}_{id}^{(i)})$) and uplink resource allocation location information to the UE on a PDCCH. Thereafter, the UE can start uplink transmission using a UE Tx beam and BS Rx beam pair corresponding to the best UE Tx beam ID.

Figure 16:
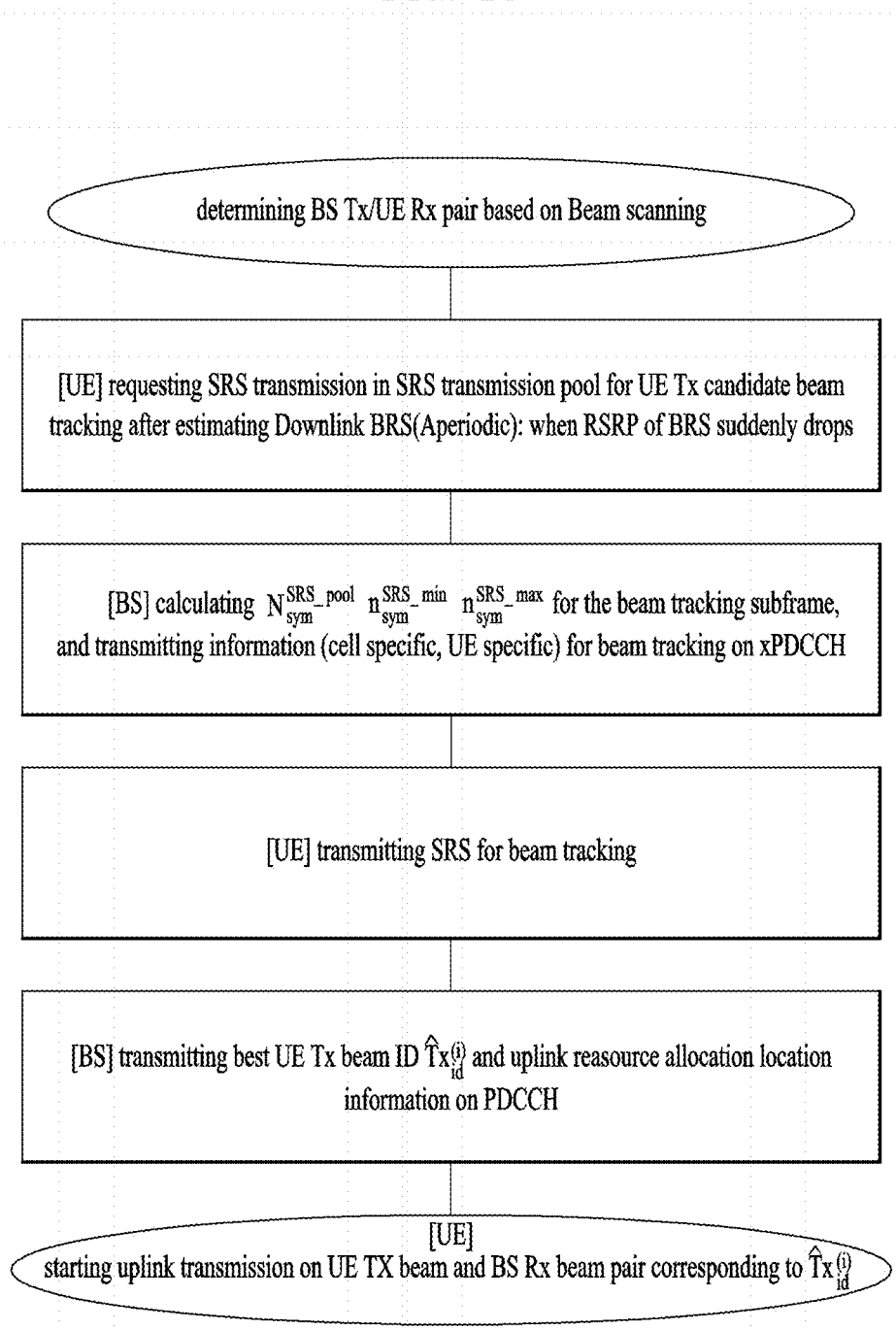
FIG. 16 is a flowchart illustrating aperiodic SRS transmission triggered by a UE.

FIG. 16 is a flowchart illustrating aperiodic SRS transmission triggered by a UE.

Referring to FIG. 16, the UE may determine BS Tx beam/UE Rx beam pairs through beam scanning together with a BS. After measuring a downlink BRS, the UE may require aperiodic SRS transmission within an SRS transmission pool for tracking UE Tx candidate beams. In particular, when the RSRP of the BRS suddenly decreases, the SRS transmission may be triggered.

The BS may calculate an SRS resource pool size, $N_{sym}^{SRS\_pool}$, $n_{sym}^{SRS\_max}$, $n_{sym}^{SRS\_min}$, etc. for a beam tracking subframe. In addition, the BS may transmit, to the UE, information for the beam tracking (i.e., cell-specific and UE-specific information for the beam tracking) on an xPDCCH.

The UE transmits SRSs for the UE Tx beam tracking, and the BS starts the beam tracking. After completing the beam tracking, the BS may transmit the ID of the best UE Tx beam ($(\widehat{Tx}_{id}^{(i)}{}_{id}^{(i)})$) and uplink resource allocation location information to the UE on a PDCCH. Thereafter, the UE can start uplink transmission using a UE Tx beam and BS Rx beam pair corresponding to the best UE Tx beam ID.

According to the above-described embodiments of the present disclosure, it is possible to reduce signaling overhead that occurs when aperiodic SRS transmission is performed.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

A method for transmitting SRS in a wireless communication system and a terminal for transmitting the SRS in the wireless communication system are industrially available in various wireless communication systems such as a 3GPP LTE/LTE-A system and a 5G communication system.

What is claimed is:

1. A method of transmitting an aperiodic Sounding Reference Symbol (SRS) by a User Equipment (UE) in a wireless communication system, the method comprising:
    receiving, from a Base Station (BS), control information including aperiodic SRS resource pool information for tracking Transmission (Tx) beams of the UE; and transmitting SRSs to the BS based on the control information,
wherein the control information including the aperiodic SRS resource pool information is transmitted by the BS based on triggering of tracking Tx beams of the UE, and the aperiodic SRS resource pool information includes SRS transmission type information,
wherein a SRS transmission type is determined based on UE-specific information, and
wherein the SRSs are used by the BS for tracking the Tx beams of the UE.

2. The method of claim 1, comprising:
receiving, from the BS, uplink resource allocation information and a best Tx beam identifier (ID) of the UE, which is selected by tracking the Tx beams of the UE; and
transmitting an uplink signal using a Tx beam of the UE corresponding to the best Tx beam ID of the UE.

3. The method of claim 1, wherein the aperiodic SRS resource pool information includes symbol size information of an aperiodic SRS resource pool and start symbol index information of the aperiodic SRS resource pool.

4. The method of claim 1, wherein the control information includes Tx candidate beam identifier (ID) information of the UE for tracking the Tx beams of the UE.

5. The method of claim 1,
wherein the SRS transmission type information indicates an SRS resource pool pattern, and
wherein the SRSs are transmitted based on the SRS resource pool pattern.

6. The method of claim 5, wherein the SRS resource pool pattern is determined based on a transmission comb pattern, whether there is a localized SRS transmission region, or whether there is a full-band SRS transmission region.

7. A User Equipment (UE) for transmitting an aperiodic Sounding Reference Symbol (SRS) in a wireless communication system, the UE comprising:
a receiver;
a transmitter; and
a processor,
wherein the processor is configured to:
control the receiver to receive, from a Base Station (BS), control information including aperiodic SRS resource pool information for tracking Transmission (Tx) beams of the UE; and
control the transmitter to transmit SRSs to the BS based on the control information,
wherein the control information including the aperiodic SRS resource pool information is transmitted by the BS based on triggering of tracking Tx beams of the UE, and the aperiodic SRS resource pool information includes SRS transmission type information,
wherein a SRS transmission type is determined based on UE-specific information, and
wherein the SRSs are used by the BS for tracking the Tx beams of the UE.

8. The UE of claim 7, wherein the processor is configured to:
control the receiver to receive, from the BS, uplink resource allocation information and a best Tx beam identifier (ID) of the UE, which is selected by tracking the Tx beams of the UE; and
control the transmitter to transmit an uplink signal using a Tx beam of the UE corresponding to the best Tx beam ID of the UE.

9. The UE of claim 7, wherein the aperiodic SRS resource pool information includes symbol size information of an SRS resource pool and start symbol index information of the SRS resource pool.

10. The UE of claim 7, wherein the control information includes Tx candidate beam identifier (ID) information of the UE for tracking the Tx beams of the UE.

11. The UE of claim 7,
wherein the SRS transmission type information indicates an SRS resource pool pattern, and
wherein the processor is configured to control the transmitter to transmit the SRSs based on the SRS resource pool pattern.

12. The UE of claim 11, wherein the SRS resource pool pattern is determined based on a transmission comb pattern, whether there is a localized SRS transmission region, or whether there is a full-band SRS transmission region.

* * * * *